(12) United States Patent
Blessinger

(10) Patent No.: US 7,995,125 B2
(45) Date of Patent: Aug. 9, 2011

(54) APPARATUS AND METHOD FOR EXTENDING THE DYNAMIC RANGE OF A READ OUT INTEGRATED CIRCUIT OF AN IMAGE SENSOR

(75) Inventor: Michael A. Blessinger, Morrisville, PA (US)

(73) Assignee: Sensors Unlimited, Inc., Princeton, NJ (US)

( * ) Notice: Subject to any disclaimer, the term of this patent is extended or adjusted under 35 U.S.C. 154(b) by 560 days.

(21) Appl. No.: 12/136,421

(22) Filed: Jun. 10, 2008

(65) Prior Publication Data

US 2009/0303363 A1    Dec. 10, 2009

(51) Int. Cl.
*H04N 3/14* (2006.01)
*H04N 5/335* (2011.01)
*H01L 27/00* (2006.01)
(52) U.S. Cl. ............... 348/301; 348/300; 250/208.1
(58) Field of Classification Search ............ 348/294, 348/300–302, 307–310; 250/208.1, 214 A, 250/214 AG
See application file for complete search history.

(56) References Cited

U.S. PATENT DOCUMENTS

| | | | |
|---|---|---|---|
| 7,268,338 B2 | 9/2007 | Liu et al. | |
| 2004/0145668 A1* | 7/2004 | Iwasawa et al. | 348/301 |
| 2005/0168602 A1* | 8/2005 | Sumi et al. | 348/294 |
| 2005/0253942 A1* | 11/2005 | Muramatsu et al. | 348/273 |
| 2006/0077271 A1* | 4/2006 | Watanabe | 348/301 |
| 2006/0181627 A1* | 8/2006 | Farrier | 348/308 |

* cited by examiner

*Primary Examiner* — David Ometz
*Assistant Examiner* — Carramah J Quiett
(74) *Attorney, Agent, or Firm* — Womble Carlyle

(57) ABSTRACT

A read out integrated circuit includes (ROIC) an array of pixel circuits, each of which has a first charge storage element electrically connected across an amplifier, and a second charge storage element having a selectively activated electrical connection across the amplifier. First and second gain select switches are configured to control the selectively activated electrical connection so as to selectively place the second charge storage element in electrical parallel with the first charge storage element and cause both the first and said second charge storage elements to store charge in response to light detected by said associated pixel. The circuit includes gain control column lines, each gain control column line configured to control a plurality of the first gain select switches belonging to pixel circuits in an associated column of the array. The circuit also includes gain control row lines, each gain control row line configured to control a plurality of the second gain select switches belonging to pixel circuits in an associated row of the array.

14 Claims, 6 Drawing Sheets

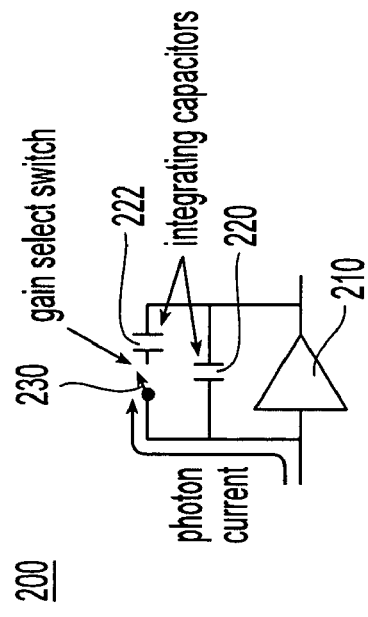
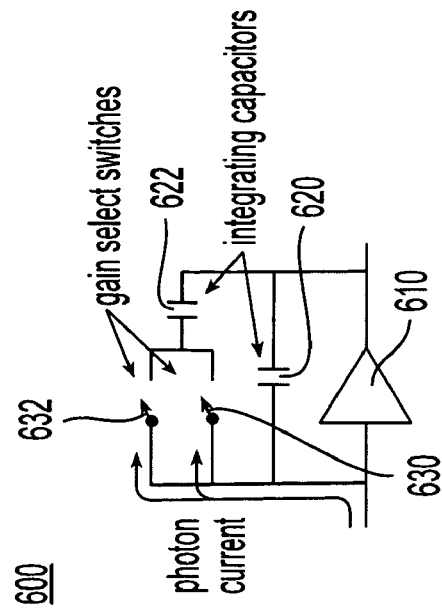
*Fig. 2*
*Fig. 6*
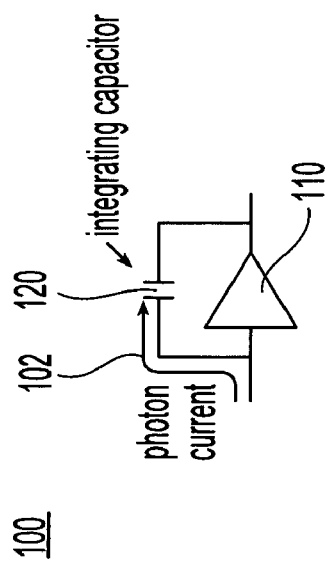
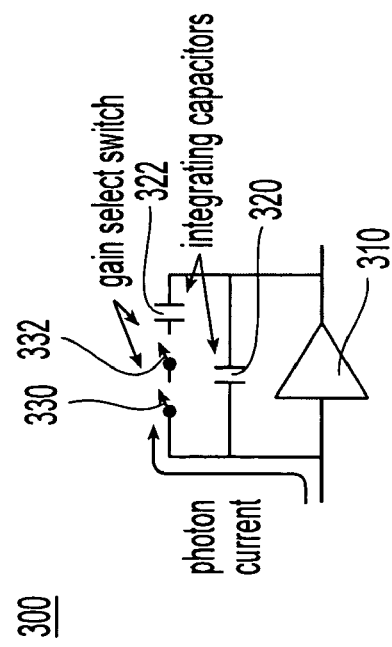
*Fig. 1*
*Fig. 3*

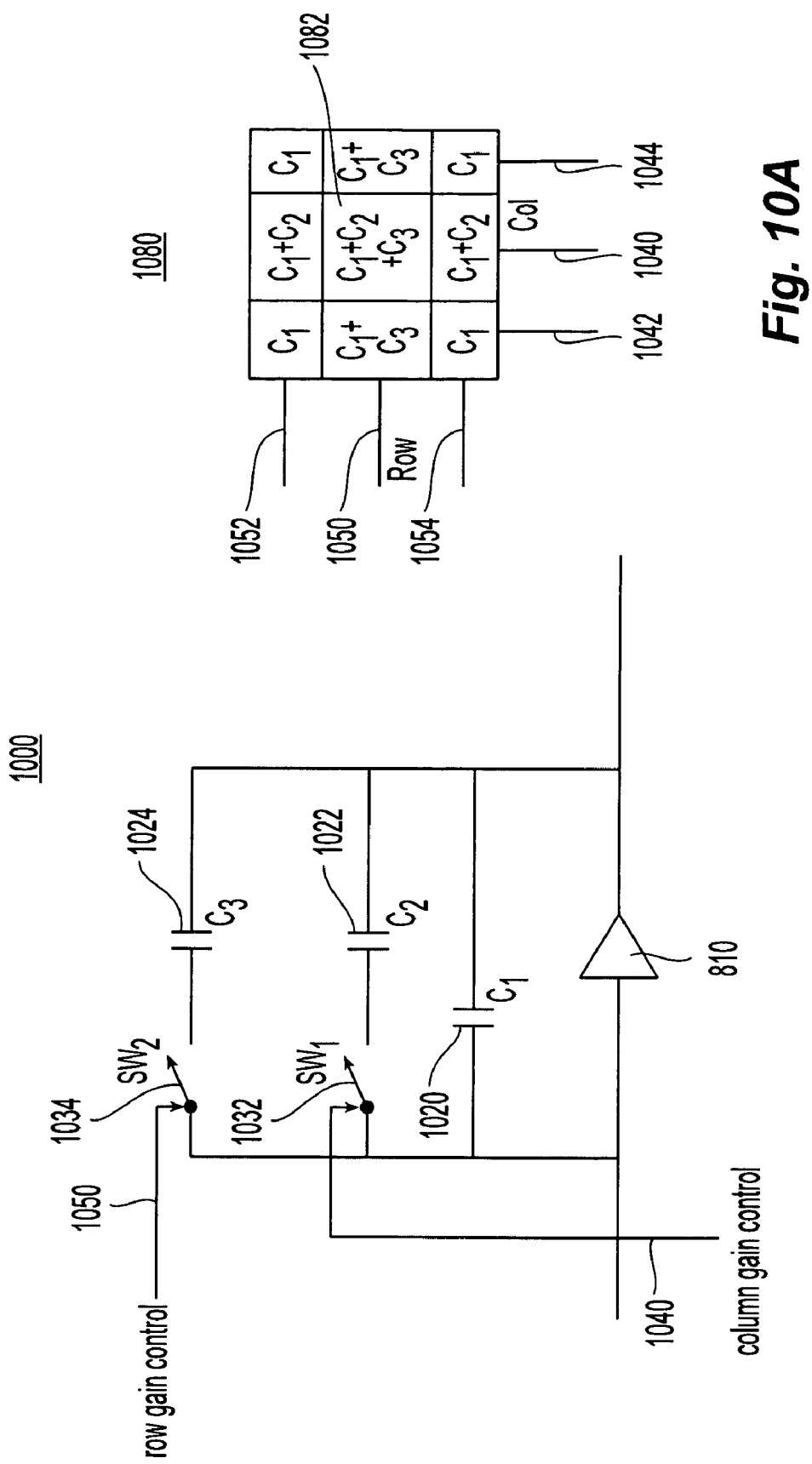

APPARATUS AND METHOD FOR EXTENDING THE DYNAMIC RANGE OF A READ OUT INTEGRATED CIRCUIT OF AN IMAGE SENSOR

CROSS REFERENCE TO RELATED APPLICATIONS

None.

BACKGROUND OF THE INVENTION

1. Field of the Invention

The present invention is related to controlling pixel gain of pixels associated with an imaging circuit associated with an image sensor. It is particularly directed to a Read Out Integrated Circuit (ROIC) of an image sensor.

2. Background

One aspect of image sensor systems, including infrared image sensor systems, is the dynamic range of the scene which can be sensed usably. The dynamic range is typically defined as the ratio of the maximum light or photon level which can be sensed without saturation to the lowest level which can be distinguished from the sensor intrinsic noise. A dynamic range of a few thousand to a few tens of thousand is typical for most image sensor pixels. However, this range is not sufficient for all possible uses. In particular, nighttime imaging where the scene contains bright light sources and also contains dim objects of interest obscured in shadows or other dark areas is particularly difficult to image effectively with conventional imaging systems. The problem is that while the sensor can often be adjusted over a wide range of dynamic ranges, all pixels in the typical system must simultaneously have the same dynamic range. One would prefer a system where some pixels are optimized for low photon levels, while others are optimized for higher levels, so that a wider range of objects could be imaged in the same image frame.

One solution to this high dynamic range image problem is to acquire many consecutive image frames looking at the same scene, with each frame varying in either its electrical gain, its integration or exposure time, or some other parameter which changes the sensitivity range of the image system for that particular image frame. These different image frames can then be combined into a single image, either electronically (as disclosed in U.S. Pat. No. 5,929,908, whose contents are incorporated by reference, or by software (such as PHOTOMATIX® available through www.hdrsoft.com, visited May 25, 2008, which combines multiple frames of still photography shots with differing exposure times to produce an extended dynamic range composite image). The result of either approach is a composite image having a much larger dynamic range than any of its constituent sub-image frames. This method is effective, but it reduces the rate of frame acquisition by the number of frames that are combined to create the single composite image. It also relies on the scene not changing during that time. Any object which is moving during this multiple frame acquisition will not appear in the same location in each sub-frame and thus will not be imaged correctly in the composite.

In order to have a large dynamic range in a single image frame, it is necessary to use a system where each pixel has the required dynamic range. This eliminates problems associated with having to combine consecutive frames into a composite. However, the dynamic range requirements for the pixel will generally not be realizable with a system having a linear response, due to the practical limitations of electrical circuits.

One approach to solving this problem utilizes some sort of non-linear response in the pixel, typically piece-wise linear (as disclosed in U.S. Pat. Nos. 6,040,570, 6,101,294 and 6,992,713, all of whose contents are incorporated by reference), or logarithmic as disclosed in Kavadia, S., "Logarithmic Response CMOS Image Sensors with On-Chip Calibration", IEEE JSSC v. 35 n. 8, August 2000, pp 1146-1152. The problem with these approaches is that they are difficult to realize practically without adverse consequences for other performance aspects of the pixel.

A second approach is to reset the pixel whenever it saturates, and count the number of resets, as disclosed in Kavusi, S., "Architectures for high dynamic range, high speed image sensor readout circuits", 2006 IFIP International Conference on Very Large Scale Integration (ISBN 3-901882-19-7), October 2006, pp. 36-41. This approach has the drawback of requiring a large area for the pixel, much larger than desired for high definition image systems.

A third approach is to provide some pixels with a low gain response, and others with a higher gain response. This avoids the practical limitations of non-linear response in every pixel, since now each pixel can be linear, and avoids the problems of having to combine sub-frames into a composite image, since the total range of dynamic range will be covered by the differing gains in the individual pixels. However, effective spatial resolution is reduced in this approach, since several adjacent pixels with different gains will have to be combined to produce the total dynamic range required.

Various methods may be used to form pixels having different response gains. For instance, the Fujifilm SR Pro camera series uses a pixel combining one photodetector with a large area for high sensitivity, and another photodetector with a small area for low gain, producing a composite pixel with an extended dynamic range. This results in adjacent pixels having different size detector responsive areas. Since the response gain is proportional to the responsive area, this produces the different gains. The various pixels are hardwired to have different size detector areas at design time, since the responsive areas are determined by the manufacturing process, and cannot be changed in use.

In a read out integrated circuit (ROIC) and other imaging circuits, the incident light or photons create an electrical current which is integrated onto a capacitor, creating a voltage which is proportional to the amount of incident photons. The proportionality depends on the size of the capacitor and also on the voltage gain of any intervening circuit. Some prior art approaches have used multiple charge integration capacitors. In fact, some line array ROICs or imagers have over five such capacitors per pixel, and some area array ROICs or imagers have two, as disclosed in Cannata, R., "Very wide dynamic range SWIR sensors for very low background applications", Proc. SPIE, 3698 (1999), pp. 756-765. Such an approach allows the pixel gain to be changed by selection of the capacitor used. However, every pixel in the array generally has the same size capacitor selected and pixel-to-pixel selection of the differing capacitor sizes in an array is simply not done.

FIG. 1 shows an electrical schematic of a prior art ROIC pixel circuit 100. ROIC pixel circuit 100 includes an amplifier 110, and an integrating capacitor 120. The photon generated electrical current 102 is integrated into the capacitor 110, as depicted by the arrow.

FIG. 2 shows an electrical schematic of another prior art ROIC pixel circuit 200. ROIC pixel circuit 200 includes an amplifier 210 and two charge integration capacitors 220, 222, arranged in parallel. A pixel gain select switch 230 is arranged in electrical series with the second charge integration capacitor 222. During operation, charge is always accumulated into the first charge integration capacitor 220. However, charge is accumulated into the second charge integration capacitor 212 only if the pixel gain select switch 230 is closed. Closing the pixel gain select switch 230 changes the total capacitor size and thus the response gain. Typically all such pixel gain select switches 230 are connected together so that the switch in every pixel is either open or closed, causing each pixel to have the same gain. Thus, the prior art ROIC pixel 200 has a first state in which the pixel gain select switch 230 is open and charge is accumulated only in the first charge integration capacitor 200, and a second state in which the pixel gain select pixel switch 230 is closed and charge is accumulated only both the first and second charge integration capacitors 220, 222, respectively. As is known to those skilled in the art, such a switch 230 is typically implemented as a transistor.

SUMMARY OF THE INVENTION

In one aspect, the present invention is directed to an image sensor integrated circuit which includes an array of pixel circuits arranged in columns and rows. Each pixel circuit has a first charge storage element electrically connected across an amplifier and configured to store charge in response to light detected by an associated pixel, and also has a second charge storage element selectively connectable in electrical parallel with said first charge storage element. Each pixel circuit also is provided with first and second gain select switches configured to selectively connect the second charge storage element in electrical parallel with the first charge storage element, and thereby allow said second charge storage element to also store charge in response to light detected by said associated pixel. A first plurality of gain control column lines are configured to simultaneously control a plurality of said first gain select switches belonging to pixel circuits in an associated column of the array. A second plurality of gain control row lines are configured to simultaneously control a plurality of said second gain select switches belonging to pixel circuits in an associated row of the array.

In another aspect, the present invention is directed to a method of controlling the dynamic range of an image sensor integrated circuit comprising an array of pixel circuits arranged in columns and rows. Each pixel circuit has a first charge storage element electrically connected across an amplifier, and first and second gain select switches configured to selectively connect a second charge storage element in electrical parallel with the first charge storage element. The inventive method comprises activating one or more gain control column lines, each gain control column line configured to simultaneously control a plurality of first gain select switches belonging to pixel circuits in an associated column of the array; and activating one or more gain control row lines, each gain control row line configured to simultaneously control a plurality of second gain select switches belonging to said pixel circuits in an associated row of the array.

In yet another aspect, the present invention is directed to an image sensor integrated circuit comprising a one-dimensional array of pixel circuits. Each such pixel circuit comprises a first charge storage element electrically connected across an amplifier and configured to store charge in response to light detected by an associated pixel, and a second charge storage element selectively connectable in electrical parallel with said first charge storage element. Each pixel circuit also has a first and second gain select switches configured to selectively connect the second charge storage element in electrical parallel with the first charge storage element, and thereby allow the second charge storage element to also store charge in response to light detected by said associated pixel. Each pixel circuit is also provided with a first set of gain control lines, each member of the first set of gain control lines configured to simultaneously control the first gain select switch of every Kth pixel circuit in the one-dimensional array, K being a first integer. Each pixel circuit is also provided with a second set of gain control lines, each member of the second set of gain control lines configured to simultaneously control the second gain select switch of every Lth pixel circuit in the one-dimensional array, L being a second integer different from K.

In still another aspect, the present invention is directed to an image sensor which includes an array of pixel circuits arranged in columns and rows. Each such pixel circuit comprises a first charge storage element electrically connected across an amplifier and configured to store charge in response to light detected by an associated pixel, and a second charge storage element selectively connectable in electrical parallel with said first charge storage element. A third charge storage element is selectively connectable in electrical parallel with said first charge storage element. A first gain select switch is configured to selectively connect the second charge storage element in electrical parallel with said first charge storage element, and thereby allow said second charge storage element to also store charge in response to light detected by said associated pixel. Furthermore, a second gain select switch is configured to selectively connect the third charge storage element in electrical parallel with said first charge storage element, and thereby allow said third charge storage element to also store charge in response to light detected by said associated pixel. In addition, a plurality of gain control column lines are configured to simultaneously control a plurality of said first gain select switches belonging to pixel circuits in an associated column of the array, to thereby connect second charge storage elements in electrical parallel with associated said first charge storage elements. A plurality of gain control row lines are configured to simultaneously control a plurality of said second gain select switches belonging to pixel circuits in an associated row of the array, to thereby connect third charge storage elements in electrical parallel with associated said first charge storage elements.

BRIEF DESCRIPTION OF THE DRAWINGS

FIG. 1 shows an electrical schematic of a prior art ROIC pixel circuit.

FIG. 2 shows an electrical schematic of another prior art ROIC pixel circuit.

FIG. 3 shows an electrical schematic of an AND-type ROIC pixel circuit in accordance with an embodiment of the present invention.

FIG. 6 shows an electrical schematic of an OR-type ROIC pixel circuit in accordance with an embodiment of the present invention.

FIG. 10 shows an electrical schematic of an ROIC pixel circuit in which each pixel has two selectively connectable integration charge storage elements, each controlled by a single gain select switch.

FIG. 10A shows an exemplary 3×3 sub-array employing the ROIC pixel circuits of FIG. 10.

DETAILED DESCRIPTION OF THE INVENTION

Figure 4:
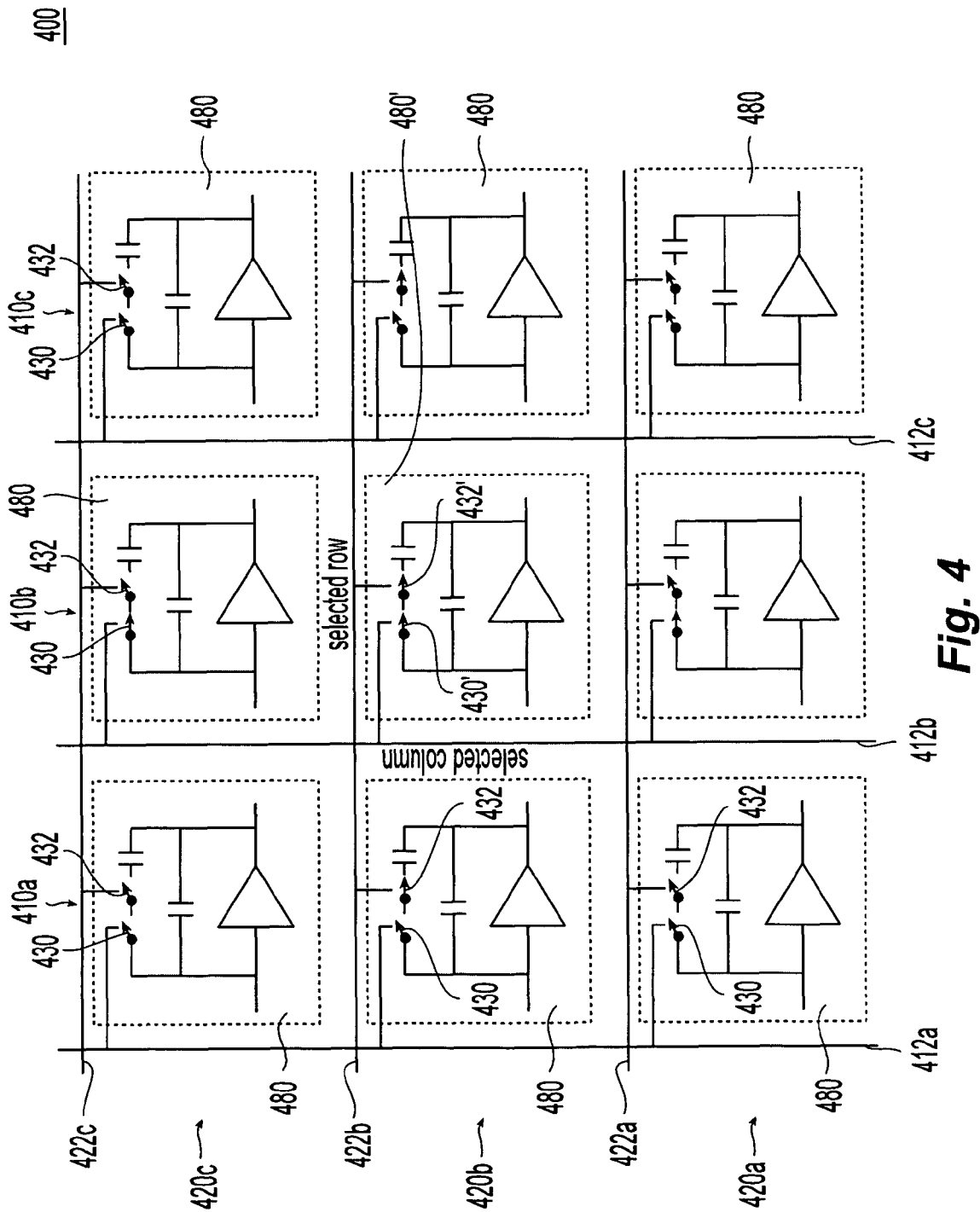
FIG. 4 shows an array of ROIC pixel circuits in accordance with FIG. 3 with the switches in a first set of states.

FIG. 3 shows an electrical schematic of an ROIC pixel circuit 300 in accordance with one embodiment of the present invention. ROIC pixel circuit 300 includes an amplifier 310 and two charge integration capacitors 320, 322, arranged in parallel. First and second pixel gain select switches 330, 332, respectively, are arranged in electrical series with the second charge integration capacitor 322. During operation, charge is always accumulated into the first charge integration capacitor 320. However, charge is accumulated in the second charge integration capacitor 322 only if both first pixel gain select switch 330 and second pixel gain select switch 332 are closed, i.e., if the two gain select switches 330, 332 are activated to thereby connect the second charge integration capacitor 322 in electrical parallel with the first charge integration capacitor 320. If, however, either or both of first pixel gain select switch 330 and second pixel gain select switch 332 is open, charge does not accumulate in the second charge integration capacitor 322. Thus, in ROIC pixel circuit 300, the second charge integration capacitor 322 is only selectively connectable in electrical parallel to the first charge integration capacitor 320, and only closing both pixel gain select switches 330, 332 changes the total charge integration capacitor size and thus the response gain in pixel ROIC 300. Thus, the ROIC pixel circuit 300 has a first state in which either or both of pixel gain select switches 330, 332 are open and charge is accumulated only in the first charge integration capacitor 320, and a second state in which both first and second pixel gain select switches 330, 332 are closed and charge is accumulated in both the first and second charge integration capacitors 320, 322, respectively. It is understood that switches 330, 332 are typically implemented as transistors. Since both the first and second pixel gain select switches 330, 332 must be selected for the capacitance to change, ROIC pixel circuit 300 is considered an "AND"-type ROIC pixel circuit.

As seen in FIG. 4, a ROIC pixel circuit sub-array 400 comprising a plurality of columns 410a, 410b, 410c and rows 420a, 420b, 420c of ROIC pixel circuits 480 can be formed. It is understood that ROIC pixel circuit 480 is similar to ROIC pixel circuit 300 of FIG. 3. As seen in FIG. 4, ROIC pixel circuit sub-array 400 is a 3×3 array. However, it is understood that ROIC pixel circuit sub-array 400 may belong to a much larger array.

In the sub-array 400, one of the gain control column lines 412a, 412b, 412c can be connected to each of the first pixel gain select switches 430 belonging to the various ROIC pixel circuits in a given column. Similarly, one of the gain control row lines 422a, 422b, 422c can be connected to each of the second pixel gain select switches 430 belonging to the various ROIC pixel circuits 480 in a given row. As seen in FIG. 4, for ROIC pixel circuit 480', both the gain control column line 412b and the gain control row line 422b are activated so that both switches 430' and 432' are closed. Accordingly, the gain for ROIC pixel circuit 480' differs from that of the remaining 8 pixel circuits 480 in the 3×3 sub-array 400. It can therefore be seen from FIG. 4 that by connecting switches in each sub-array of ROIC pixel circuits in a proper manner, it is possible to have a single pixel within that sub-array to have both switches closed, thereby causing only that pixel to have a different response gain as compared to the others. This allows one to form a large array of pixels in which only one pixel in each M×N sub-array has a gain different from that of the remaining M×N−1 pixels.

However, by selecting a plurality of either gain control row lines or gain control column lines, or both, it is possible to provide more than a single pixel within an M×N sub-array with a gain different from the remaining pixels.

Figure 5:
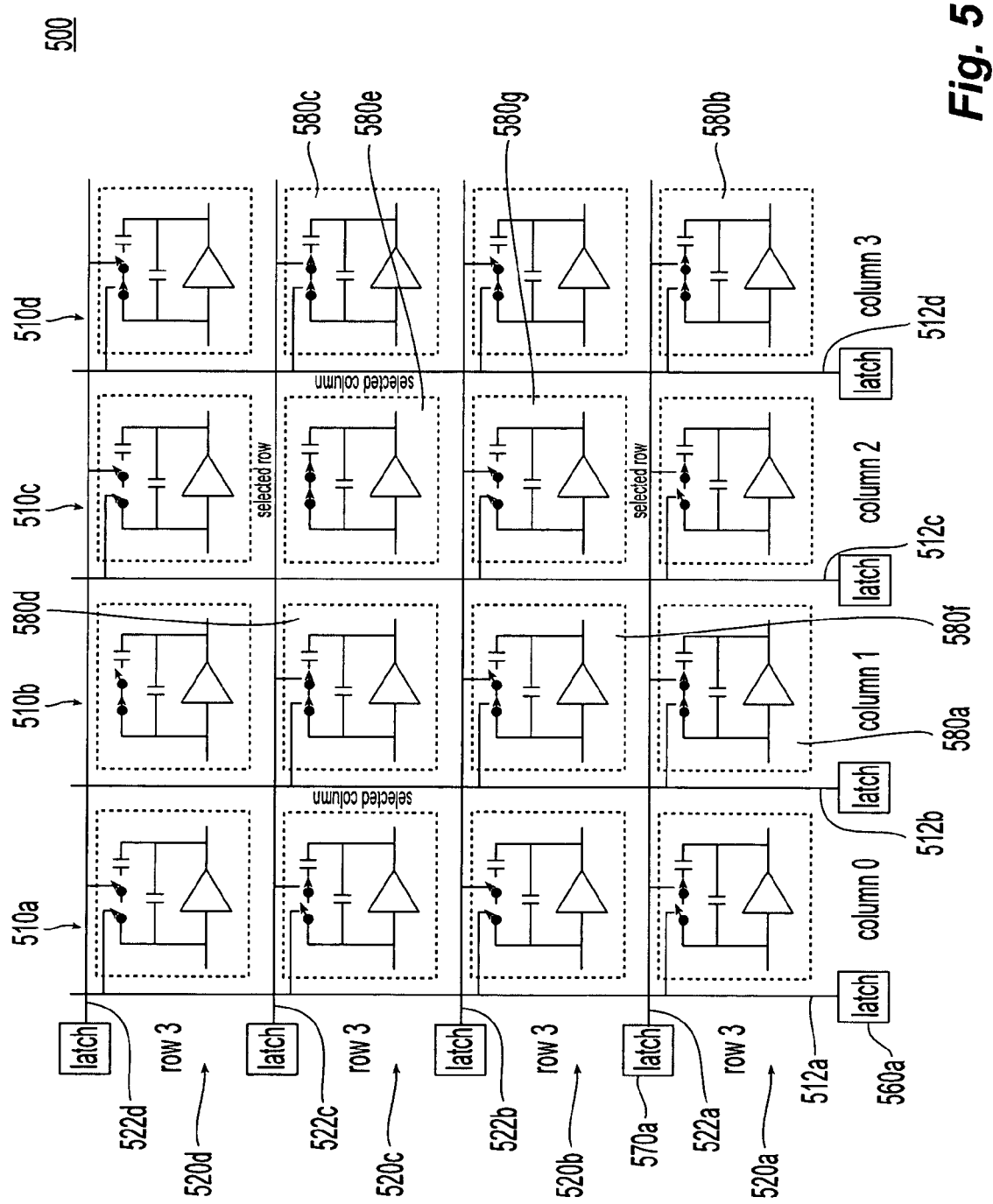
FIG. 5 shows an array of ROIC pixel circuits in accordance with FIG. 3 with the switches in a second set of states.

For instance, as seen in FIG. 5, in ROIC pixel circuit sub-array 500, more than one ROIC pixel circuit within a sub-array can have may have both switches closed, by selecting the appropriate gain control row and column lines. In sub-array 500, the ROIC pixel circuits are the same as the ROIC pixel circuits 300 seen in FIG. 3. The sub-array 500 comprises four columns 510a, 510b, 510c, 510d and four rows 520a, 520b, 520c, 520d of AND-type ROIC pixel circuits (i.e., a M×N=4×4 sub-array). Gain control column lines 512a, 512b, 512c, 512d each control the first switch in a corresponding column and gain control row lines 522a, 522b, 522c, 522d each control the second switch in a corresponding row. Selecting gain control column lines 512b and 512d and gain control row lines 522a and 522c causes both switches of ROIC pixel circuits 580a, 580b, 580c and 580d to close. Thus, in the embodiment seen in FIG. 5, every other pixel in both the row dimension and the column dimension has a gain different from the remaining pixels. It is understood, however, that one might instead have chosen to select gain control column lines 512b and 512c and gain control row lines 522b, 552c, thereby resulting in the four central ROIC pixel circuits 580d, 580e, 580f and 580g to have both their switches closed. In this latter case, then, a 2×2 central block of ROIC pixel circuits within the 4×4 sub-array would have a gain different from the remaining ROIC pixel circuits.

FIG. 6 shows an electrical schematic of an ROIC pixel circuit 600 in accordance with a second embodiment of the present invention. Like ROIC pixel circuit 300, ROIC pixel circuit 600 includes an amplifier 610 and two charge integration capacitors 620, 622, arranged in parallel. First and second pixel gain select switches 630, 632, respectively, are arranged in electrical parallel with the second charge integration capacitor 622. During operation, charge is always accumulated into the first charge integration capacitor 620. However, charge is accumulated in the second charge integration capacitor 622 if either first pixel gain select switch 630 or second pixel gain select switch 632 (or both) are closed. If, however, both of first pixel gain select switch 630 and second pixel gain select switch 632 are open, charge does not accumulate in the second charge integration capacitor 622. Thus, in ROIC pixel circuit 600, closing either or both pixel gain select switches 630, 632 changes the total charge integration capacitor size and thus the response gain. Thus, the ROIC pixel circuit 600 has a first state in which neither pixel gain select switch 330, 332 is closed and charge is accumulated only in the first charge integration capacitor 620, and a second state in which either or both of the first and second pixel gain select switches 330, 332 are closed and charge is accumulated in both the first and second charge integration capacitors 320, 322, respectively. It is again understood that switches 330, 332 are typically implemented as transistors. Since either or both the first and second pixel gain select switches 330, 332 must be selected for the capacitance to change, ROIC pixel circuit 300 is considered an "OR"-type ROIC pixel circuit.

Figure 7:
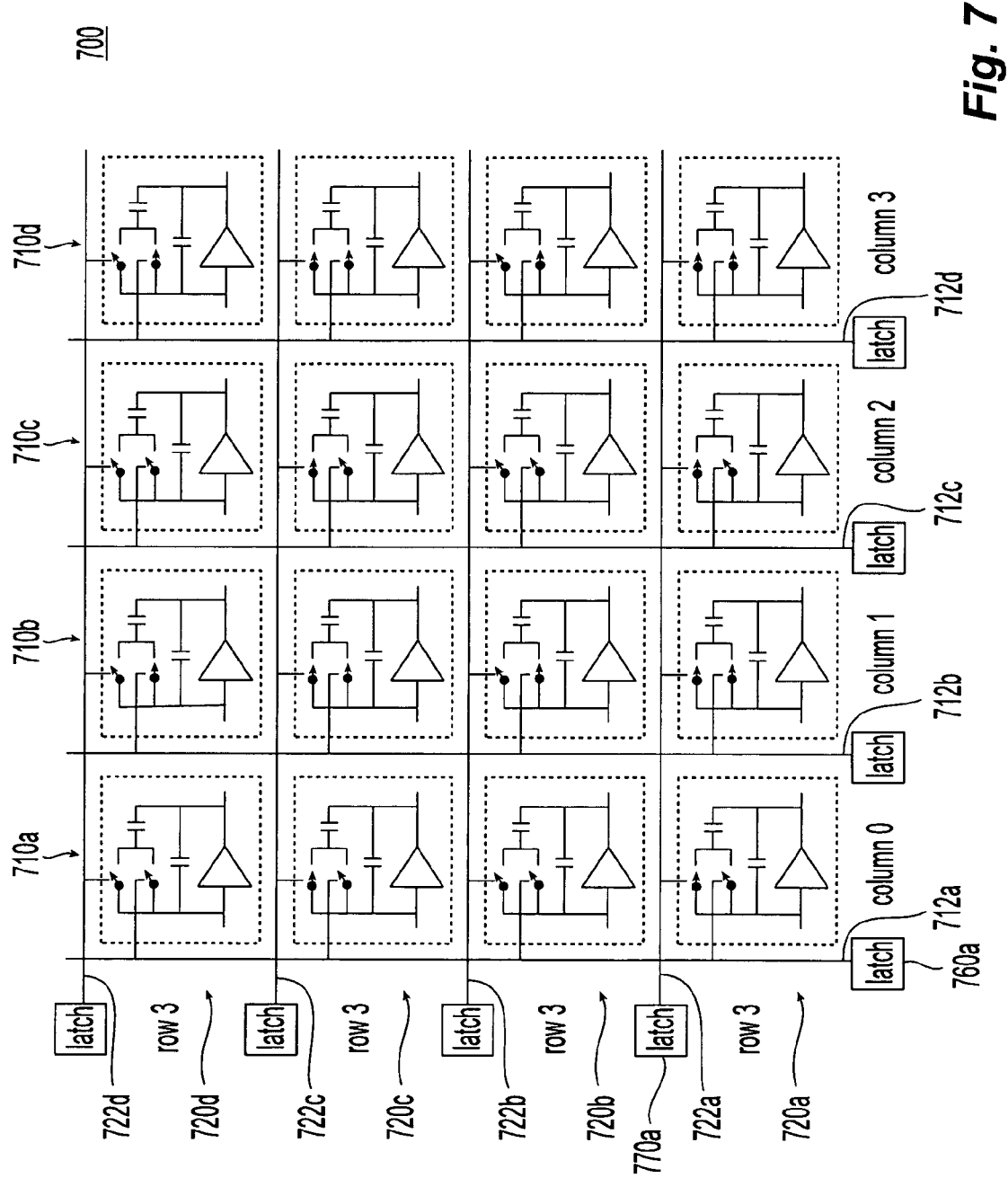
FIG. 7 shows an array of ROIC pixel circuits in accordance with FIG. 6 with the switches in a third set of states.

FIG. 7 shows a 4×4 sub-array 700 of ROIC pixel circuits of the sort seen in FIG. 6. Thus, in contrast to the sub-array 500 of FIG. 5, sub-array 700 employs OR-type ROIC pixel circuits. The sub-array 700 comprises four columns 710a, 710b, 710c, 710d and four rows 720a, 720b, 720c, 720d of OR-type ROIC pixel circuits. Gain control column lines 712a, 712b, 712c, 712d each control the first switch in a corresponding column and gain control row lines 722a, 722b, 722c, 722d each control the second switch in a corresponding row. Selecting gain control column lines 712b and 512d and gain control row lines 522a and 522c causes all the OR-type ROIC pixels circuits in the corresponding columns 710b, 710d and rows 720a, 720c to have at least one of the first and second switches closed, thereby changing the gain for those OR-type ROIC pixels circuits.

Regardless of whether an array of AND-type or OR-type ROIC pixel circuits are chosen, the selection state of every column and row is stored in a latch 560a, 760a, 570a, 770a at the edge of the pixel array. The contents of this set of latches can be controlled in one or more of a number of ways. One way is to use a set of decoders which determine whether any particular row or column is within a range of row and column addresses specified by the user, such as in software that drives the ROIC. Another method would be to have alternating latches selected so that alternating rows and alternating columns are selected, leading to a pattern where one pixel out of a group of two by two pixels is a different gain than the other three in the group. As stated above, one may generalize this so that one pixel out of a group of M×N pixels, M being the number of columns and N being the number of rows, has a different gain that the remaining M×N−1 pixels.

In the arrangement where alternating rows and columns are selected, leading to one pixel out of a group of two by two having a different gain, the effect is to provide an image where three fourths of the pixels have one gain, and one fourth has the other. This allows a composite image to be constructed where in any group of two by two pixels, if the high gain pixels are saturated, the low gain pixel in the group can substitute for them. Likewise, if the low gain pixels are not saturated, the high gain pixel could be replaced by some average of the surrounding low gain pixels. Whether one would choose the embodiment of FIG. 5 based on AND-type ROIC pixel circuits or of FIG. 7 based on OR-type ROIC pixel circuits would depend on whether one would want three of the pixels to be low gain and one high, or three high gain and one low.

In the foregoing discussion, reference was made to ROIC pixel circuits. It is understood, however, the principles of the present invention may be applied to most imaging circuits in which there are two or more charge integration capacitors onto which the current produced by the light or photons incident on a single pixel is integrated. Thus, the principles herein may potentially apply to any type of pixel circuit, including but not limited to, a charge transimpedance amplifier (CTIA) circuit, a direct or buffered direct injection circuit, and a gate or buffered gate modulation circuit.

Furthermore, the principles of the present invention may be applied to a line array. In the case of a line array, a first set of gain control lines may have each member thereof connected to the first gain select switch of every Kth pixel circuit in the array, while a second set of gain control lines may have each member thereof connected to the second gain select switch of every Lth pixel circuit in the one-dimensional array, K and L being integer values. For instance, in one embodiment, K may be 2 and L may be 4. In another embodiment, K may be 2 and L may be 3. K and L may both take on other values, as well. Thus, a gain control line belonging to the first set is configured to simultaneously control every Kth gain select switch, while a gain control line belonging to the second set is configured to simultaneously control every Lth gain select switch. With a line array, even more complicated arrangements can be implemented since there is only a one row and one is not limited to an intersection of a row and a column. Therefore, any arbitrary arrangement of gain capacitors and controlling select lines is possible.

In addition, the invention may be applied to pixels with more than two charge integration capacitors. This will provide more than two possible response gains for the pixel. In the case of three charge integration capacitors, there can be three or more possible gain states, depending on how the charge integration capacitors and switches are configured. In one configuration, there may be exactly three gain states: low, medium, and high, with an additional select switch provided for each additional charge integration capacitor. The switches can be connected in series or in parallel, or in some combination of both series and parallel, whichever way provides the desired arrangement of low through high gains. Additional column and row select lines controlled by latches, in an arrangement similar to that shown in FIGS. 5 and 7 would be used.

Figure 8:
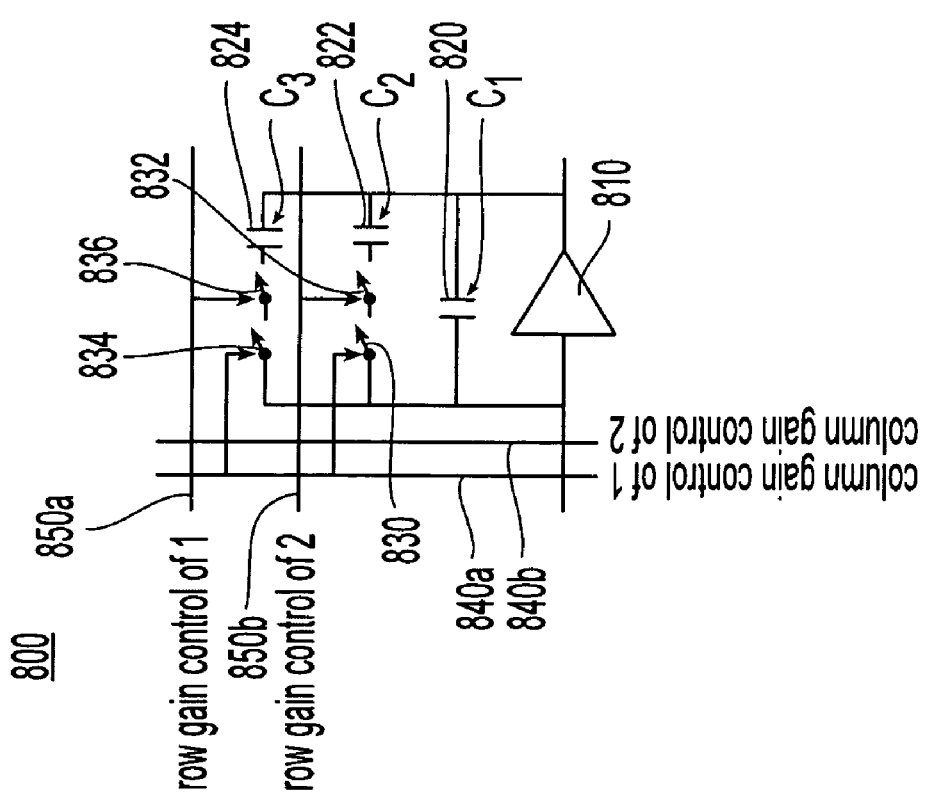
FIG. 8 shows an electrical schematic of an AND-type ROIC pixel circuit in accordance with an embodiment of the present invention in which each pixel has two selectively connectable integration charge storage elements.

FIG. 8 shows an AND-type ROIC pixel circuit 800 which comprises an amplifier 810, and first, second and third charge integration capacitors 820, 822 and 824 respectively, having capacitances C1, C2 and C3, respectively. The AND-type ROIC pixel circuit 800 also comprises first, second, third and fourth gain select switches, 830, 832, 834 and 836, respectively. First charge integration capacitor 820 is connected across the amplifier 810, while second and third charge integration capacitors 822, 824, respectively, are independently selectively connectable in parallel across the first charge integration capacitor, and so four charge integration capacitor combinations are possible, C1 alone, C1+C2, C1+C3 and C1+C2+C3.

To connect either of the second and third charge integration capacitors 822, 824 in electrical parallel with first charge integration capacitor 820, one must activate at least one gain control column line and one gain control row line. Specifically, to connect second charge integration capacitor 822, one must activate (a) first gain control column line 840a to activate first gain select switch 830 and (b) second gain control row line 850b to activate second gain select switch 832. Similarly, to connect third charge integration capacitor 824, one must activate (a) second gain control column line 840b to activate third gain select switch 834 and (b) first gain control row line 850a to activate fourth gain select switch 836. It should be evident to one skilled in the art that activating both gain control column lines 840a, 840b and both gain control row lines 850a, 850b will simultaneously connect both second charge integration capacitor 822 and third charge integration capacitor 824 in electrical parallel with first charge integration capacitor, resulting in a total charge integration capacitance of C=C1+C2+C3.

Figure 9:
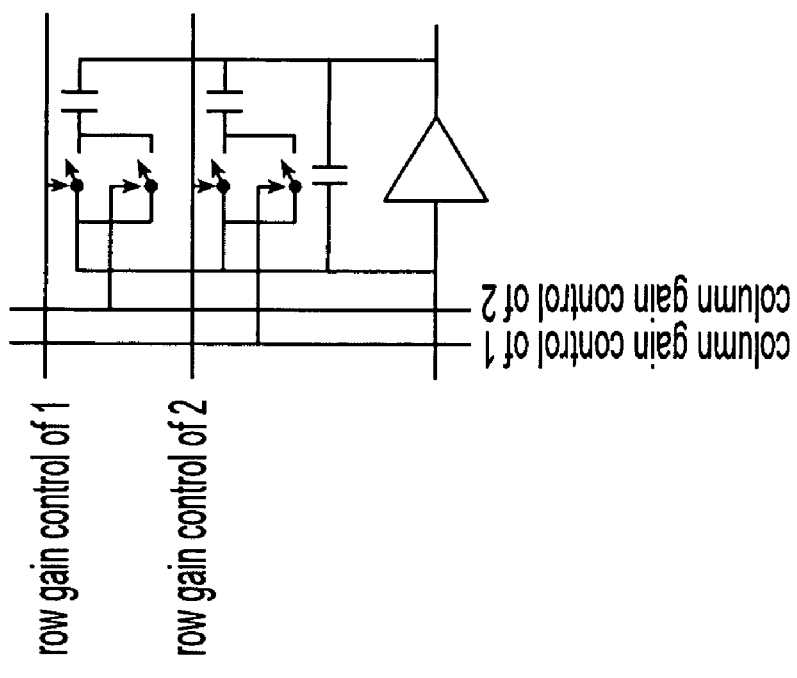
FIG. 9 shows an electrical schematic of an OR-type ROIC pixel circuit in accordance with an embodiment of the present invention in which each pixel has two selectively connectable integration charge storage elements.

FIG. 9 shows an OR-type ROIC pixel circuit 900 counterpart to the AND-type ROIC pixel circuit 800 of FIG. 8. In this instance, activating either or both of a gain control column line and gain control row line with connect a corresponding charge integration capacitor, much as the case with the OR-type ROIC pixel circuit 600 seen in FIG. 6.

In light of FIGS. 8 and 9, it is understood that one may have 3 or 4, or even more, gain control column lines and row control column lines, to selectively connect a corresponding number of secondary charge integration capacitors to a primary charge integration capacitor.

In yet another configuration, based on the OR-Type ROIC pixel circuit 1000 seen in FIG. 10, it may be appropriate for some applications to employ a single gain select switch per integration charge storage device. As seen in FIG. 10, ROIC pixel circuit 1000 includes an amplifier 1010, and first, second and third capacitors 1020, 1022, 1024, respectively, having capacitances C1, C2 and C3, respectively. Of those, capacitor 1020 is "hardwired" and always receives charge. However, capacitors 1022 and 1024 are selectively connectable in parallel with capacitor 1020, depending on the positions of first pixel gain select switch SWI 1032 and the second pixel gain select switch SW2 1034. In the embodiment shown, first pixel gain select switch SWI 1032 is controlled by gain control column line 1040 while second pixel gain select switch SW2 1034 is controlled by gain control row line 1050. An inspection of the ROIC pixel circuit 1000 shows that four integration capacitances may be possible: C1, C1+C2, C1+C3, and C1+C2+C3 for this single pixel circuit depending on the states of lines 1040 and 1050.

FIG. 10A shows gain information for each pixel circuit in a 3×3 sub-array 1080 of pixel circuits 1000. In the sub-array 1080, only the middle pixel circuit 1082 has both the first and second pixel gain select switches activated as a result of gain control column line 1040 and gain control row line 1050 both being activated, while adjacent gain control column lines 1042, 1044 and row lines 1052, 1054 remain unactivated.

It can be seen from FIG. 10A, that if C2=C3, then the 3×3 sub-array 1080 would have a middle pixel circuit 1082 with a first gain state of C=C1+2C2, upper, lower, left and right pixel circuits with a second gain state of C1+C2, and four corner pixel circuits with a gain state of C1. It is further understood that this 3×3 sub-array gain pattern can be replicated across an image sensor.

It is further understood from all the foregoing that other M×N sized patterns formed from various numbers of selectively connectable capacitors, pixel gain select switches, and gain control column and row lines may be replicated across an image sensor.

While the present invention has been described herein above in connection with a plurality of aspects and embodiments, it is understood that these aspects and embodiments were presented by way of example with no intention of limiting the invention. Accordingly, the present invention should not be limited to any specific embodiment or aspect, but rather construed in breadth and broad scope in accordance with the recitation of the claims appended hereto.

What is claimed is:

1. An image sensor integrated circuit comprising:
  an array of pixel circuits arranged in columns and rows, each pixel circuit comprising:
    a first charge storage element electrically connected across an amplifier and configured to store charge in response to light detected by said each pixel circuit;
    a second charge storage element; and
    first and second gain select switches configured to selectively connect the second charge storage element in electrical parallel with said first charge storage element, and thereby allow said second charge storage element to also store charge in response to light detected by said each pixel circuit;
  a first plurality of gain control column lines, each of said first plurality of gain control column lines configured to simultaneously control a plurality of said first gain select switches belonging to pixel circuits in an associated column of the array; and
  a second plurality of gain control row lines, each of said second plurality of gain control row lines configured to simultaneously control a plurality of said second gain select switches belonging to pixel circuits in an associated row of the array.

2. The image sensor integrated circuit according to claim 1, wherein:
  each pixel circuit belongs to a read out integrated circuit (ROIC).

3. The image sensor integrated circuit according to claim 1, wherein:
  in each pixel circuit, both the first and second gain select switches must be activated to connect the second charge storage element in electrical parallel with said first charge storage element.

4. The image sensor integrated circuit according to claim 1, wherein:
  in each pixel circuit, activating just one of the first and second switches connects the second charge storage element in electrical parallel with said first charge storage element.

5. The image sensor integrated circuit according to claim 1, further comprising:
  in each pixel circuit:
    a third charge storage element; and
    third and fourth gain select switches configured to selectively connect said third charge storage element in electrical parallel with said first charge storage element, and thereby allow said third charge storage element to also store charge in response to light detected by said each pixel circuit; and
  a third plurality of gain control column lines, each of said third plurality of gain control column lines configured to simultaneously control to a plurality of said third gain select switches belonging to pixel circuits in an associated column of the array; and
  a fourth plurality of gain control row lines, each of said fourth plurality of gain control rows line configured to simultaneously control a plurality of said fourth gain select switches belonging to pixel circuits in an associated row of the array.

6. The image sensor integrated circuit according to claim 5, wherein:
  in each pixel circuit, both the third and fourth gain select switches must be activated to connect the third charge storage element in electrical parallel with said first charge storage element.

7. The image sensor integrated circuit according to claim 5, wherein:
  in each pixel circuit, activating just one of the third and fourth switches connects the third charge storage element in electrical parallel with said first charge storage element.

8. A method of controlling the dynamic range of an image sensor integrated circuit comprising an array of pixel circuits arranged in columns and rows, each pixel circuit having a first charge storage element electrically connected across an amplifier, and first and second gain select switches configured to selectively connect a second charge storage element in electrical parallel with the first charge storage element, the method comprising:
  activating one or more gain control column lines, each gain control column line configured to simultaneously control a plurality of first gain select switches belonging to pixel circuits in an associated column of the array; and
  activating one or more gain control row lines, each gain control row line configured to simultaneously control a plurality of second gain select switches belonging to said pixel circuits in an associated row of the array.

9. An image sensor integrated circuit comprising:
a one-dimensional array of pixel circuits, each pixel circuit comprising:
- a first charge storage element electrically connected across an amplifier and configured to store charge in response to light detected by said each pixel circuit;
- a second charge storage element; and
- first and second gain select switches configured to selectively connect the second charge storage element in electrical parallel with said first charge storage element, and thereby allow said second charge storage element to also store charge in response to light detected by said each pixel circuit;

a first set of gain control lines, each member of said first set of gain control lines configured to simultaneously control the first gain select switch of every Kth pixel circuit in said one-dimensional array, K being a first integer; and a second set of gain control lines, each member of said second set of gain control lines configured to simultaneously control the second gain select switch of every Lth pixel circuit in said one-dimensional array, L being a second integer different from K.

10. The image sensor integrated circuit according to claim 9, wherein:
each pixel circuit belongs to a read out integrated circuit (ROIC).

11. The image sensor integrated circuit according to claim 9, wherein:
in each pixel circuit, both the first and second switches must be activated to place the second charge storage element in electrical parallel with said first charge storage element.

12. The image sensor integrated circuit according to claim 9, wherein:
in each pixel circuit, activating just one of the first and second switches connects the second charge storage element in electrical parallel with said first charge storage element.

13. An image sensor integrated circuit comprising:
an array of pixel circuits arranged in columns and rows, each pixel circuit comprising:
- a first charge storage element electrically connected across an amplifier and configured to store charge in response to light detected by said each pixel circuit;
- a second charge storage element;
- a third charge storage element;
- a first gain select switch configured to selectively connect the second charge storage element in electrical parallel with said first charge storage element, and thereby allow said second charge storage element to also store charge in response to light detected by said each pixel circuit; and
- a second gain select switch configured to selectively connect the third charge storage element in electrical parallel with said first charge storage element, and thereby allow said third charge storage element to also store charge in response to light detected by said each pixel circuit;

a plurality of gain control column lines, each gain control column line configured to simultaneously control a plurality of said first gain select switches belonging to pixel circuits in an associated column of the array, to thereby connect second charge storage elements in electrical parallel with associated said first charge storage elements; and a plurality of gain control row lines, each gain control row line configured to simultaneously control a plurality of said second gain select switches belonging to pixel circuits in an associated row of the array, to thereby connect third charge storage elements in electrical parallel with associated said first charge storage elements.

14. The image sensor integrated circuit according to claim 13, wherein:
each pixel circuit belongs to a read out integrated circuit (ROIC).

* * * * *